United States Patent
Sobel et al.

(10) Patent No.: US 7,437,764 B1
(45) Date of Patent: Oct. 14, 2008

(54) VULNERABILITY ASSESSMENT OF DISK IMAGES

(75) Inventors: William E. Sobel, Stevenson Ranch, CA (US); Henri Isenberg, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 828 days.

(21) Appl. No.: 10/714,550

(22) Filed: Nov. 14, 2003

(51) Int. Cl.
*G06F 11/36* (2006.01)
(52) U.S. Cl. .......................... 726/25; 726/22; 713/176
(58) Field of Classification Search ................ 726/22, 726/25
See application file for complete search history.

(56) References Cited

U.S. PATENT DOCUMENTS

| | | | | |
|---|---|---|---|---|
| 5,440,723 A | * | 8/1995 | Arnold et al. ............... | 714/2 |
| 5,696,822 A | * | 12/1997 | Nachenberg ............... | 726/24 |
| 6,067,410 A | * | 5/2000 | Nachenberg ............... | 703/28 |
| 6,253,324 B1 | * | 6/2001 | Field et al. .................. | 713/187 |
| 6,519,762 B1 | * | 2/2003 | Colligan et al. ............ | 717/170 |
| 6,615,365 B1 | * | 9/2003 | Jenevein et al. ............. | 714/6 |
| 6,857,059 B2 | * | 2/2005 | Karpoff et al. ............. | 711/209 |
| 7,103,913 B2 | * | 9/2006 | Arnold et al. .............. | 726/22 |
| 2003/0212716 A1 | * | 11/2003 | Steele et al. ............... | 707/203 |

\* cited by examiner

*Primary Examiner*—Kambiz Zand
*Assistant Examiner*—William S Powers
(74) *Attorney, Agent, or Firm*—Van Pelt, Yi & James LLP

(57) ABSTRACT

Images are used to safeguarding machines by assessing vulnerabilities in the image. Where assessing vulnerabilities includes both detection and repair, vulnerabilities are detected, a security definition/update is determined for use in repairing the vulnerability, which may include elimination, patching, fixing, writing data to a file or file system associated with the image, or modifying configuration settings. The security definition/update is tested to determine whether to implement the definition and, if test criteria are successfully passed, to permit a system application of the image such as a system restoration following a catastrophic system failure (i.e., disk or drive crash, reboot, etc.).

4 Claims, 8 Drawing Sheets

VULNERABILITY ASSESSMENT OF DISK IMAGES

CROSS REFERENCE TO RELATED APPLICATIONS

This application is related to co-pending U.S. patent application Ser. No. 10/642,355 entitled "Safely Rolling Back a Computer Image," filed Aug. 14, 2003, which is incorporated herein by reference for all purposes

FIELD OF THE INVENTION

The present invention relates generally to security applications. More specifically, vulnerability assessment of images is disclosed.

BACKGROUND OF THE INVENTION

Security software encompasses a variety of applications, including system restoration after, for example, a catastrophic system failure or compromise. System restoration applications repair or restore a damaged system state by rolling back the system to a previous secure and safe state. A damaged system can result from vulnerability exploitation, system compromise, or catastrophic failure of system resources (e.g., disk failure, compromise of operating system, etc.). A damaged system may also result from unforeseen software incompatibilities, user error, etc. Images can be used to provide a restore point or safe state for rolling back a system. In some cases, images may be used to configure new equipment in a desired way, or to provide multiple environments on a single computer. Images, such as those generated by the Ghost utility application available from Symantec Corporation, may comprise "snapshots" of a system or operating environment taken at a given point in time. As used herein, the term image may comprise a disk image, such as one generated by Norton Ghost, or any other type of file or repository of data representing the state of a physical or virtual system, such as may be used to restore or configure the system, including without limitation a disk image, a virtual machine file, or backup tape or other backup medium. Images, which include files and configuration settings, may embody a virtual "system" or machine that represents a collection of files and data that can be run as a system. In the case of a Microsoft Windows-based computing environment, registries containing configuration settings may be included in the images. Other databases or files containing configuration settings for operating environments other than Windows may also be included in images.

Although a system associated with an image can be scanned for known vulnerabilities at or before the time of image creation, new vulnerabilities could occur or be discovered or exploited after the image is created, but before the image is used, e.g., in a system restoration. The use of these vulnerable images may unknowingly create an unsafe state.

While in some cases it may be possible to access all or some of the files associated with an image for purposes of performing a search of the files for the presence of suspect code, vulnerable files, or other indicia of a newly-discovered vulnerability, such a search may not be sufficient to detect and repair certain vulnerabilities, such as those that might require that the NT Windows registry (or similar configuration database) be updated, for example.

Thus, there is a need for a solution to detect and repair vulnerabilities in images prior to system restoration or other use of the image.

BRIEF DESCRIPTION OF THE DRAWINGS

Various embodiments of the invention are disclosed in the following detailed description and the accompanying drawings.

DETAILED DESCRIPTION

Figure 1A:
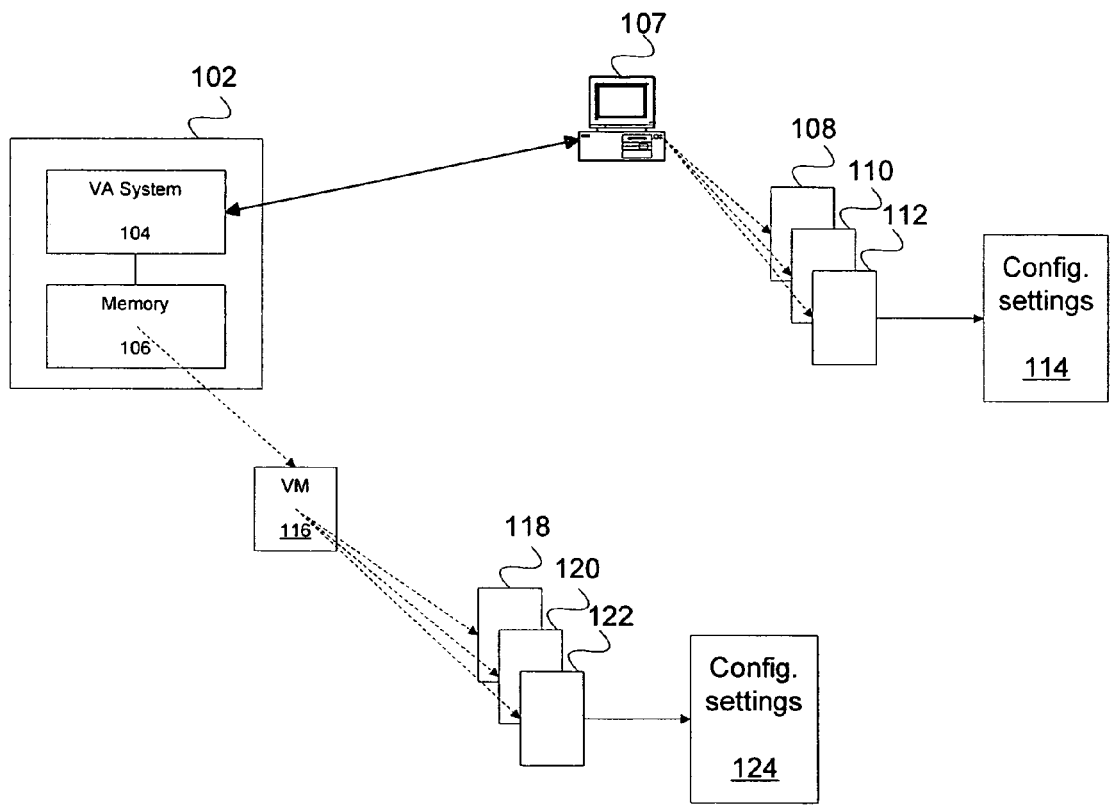
FIG. 1A illustrates a vulnerability assessment system and exemplary implementations.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

Using images or "snapshots," system backup applications take a snapshot of a system at a given time. As used herein, the term "image" includes images created by backup and configuration applications, such as Symantec's Norton Ghost, as well as other applications and media used to store system backup data, such as backup tapes, zip drives, and the like. These images may be used as safe states for restoring a system after a catastrophic failure such as a system crash, and in some cases may be used to apply a standard or initial configuration to new computers, or to store a particular environment or system state for future use, e.g., by one of multiple users of the same hardware. However, if an image stores the system in a state that is vulnerable, e.g., the system was already infected with a computer virus or worm, or had not yet had a patch applied that is needed to protect the system from a vulnerability, using the image to restore or configure a system may leave the system so restored or configured vulnerable. Providing a way to treat the files and data embodied in such an image as an instance of an integrated system for purposes of enabling effective detection and repair of vulnerabilities is disclosed. In particular, accessing and modifying configuration data within images as described herein can be performed to prevent the installation or implementation of vulnerable states during a system restoration. In order to ensure that safe states are implemented when performing a system restoration, vulnerability assessments such as an anti-virus scan are performed on image data contained in files, configuration settings, registries, and other system resources. In so doing, it is possible to either invalidate a vulnerable image or update the vulnerable image in order to ensure that a safe state will exist, if used in a system restoration or configuration.

FIG. 1A illustrates a vulnerability assessment system and exemplary implementations. As described herein, assessing a vulnerability may include both detection and repair of the vulnerability. Host 102 includes vulnerability assessment (VA) engine 104 and memory 106. VA engine 104 is described in further detail below in connection with FIG. 1B. Memory 106 may be implemented using a variety of techniques for data storage including, but not limited to, storage disks, drives, disk arrays, storage area networks (SANs), network-attached storage (NAS), and other storage facilities. Memory 106 provides a storage capability for host 102, which includes storing images, configuration settings, security definitions and updates, and other data related to vulnerability assessments and system restoration. Host 102 is shown in data communication with a potentially vulnerable system 107, on which the VA system 104 may be configured to perform a vulnerability assessment as described more fully below. Host 102 can be a computer, client, server, mainframe, minicomputer, or other computing system. In terms of deployment, VA system 104 can be deployed on a single host or, in a multi-host or internetwork environment, on multiple hosts. Data is stored on system 107, including files 108-112 and configuration settings 114. Data may also be stored in other forms (e.g., objects, programs, applications, etc.) and the techniques described herein are not intended to be limited to files and configuration settings. Further, files and configuration settings can include programs, applications, systems, and other resources. The configuration settings 114 may be stored in a configuration database, such as the Windows NT registry in a system running the Windows NT operating system. As noted above, tools have been provided to facilitate the backup, recovery, and configuration of systems such as system 107, such as by enabling a user to generate an "image" of the hard drive or other storage device on which the files 108-112 and configuration settings 114 reside.

A vulnerability assessment system such as VA system 104 may be configured to scan a system such as system 106, and its associated files and configuration data, for vulnerabilities, and in some cases to repair the vulnerabilities detected, such as by removing a virus-infected file or installing a software "patch" to protect against a vulnerability. The vulnerability may be repaired in a variety of manners, including by writing data to files, installing a patch, re-writing routines or processes, changing variables, modifying configuration settings, configuring the image to a safe state based on established configurations for eliminating the vulnerability, and other techniques for modifying the selected image. Images are scanned by VA system 104, which may include anti-virus (AV) applications as discussed below in connection with FIG. 1B. The VA system 104 may be configured as disclosed herein to also scan and repair an image or other data repository used to backup or otherwise store or capture the files and configuration data associated with the system 107 at a given point in time. For example, the VA system 104 may be configured to receive and recognize as an image (or other backup repository) a file or set of files and configuration data associated with system 107 from a remote computer, such as the system 107 itself or another remote computer configured to store the image and provide it or make it available to the VA system 104. Alternatively, the VA system 104 may be configured to read the image from the memory 106 of host 102, or from a removable data storage device associated with host 102, such as a CD-ROM or floppy disk drive. The VA system 104 may be configured to identify and read the files and configuration data stored in the image and access the files and configuration data as it would an instance of an operating system. In some embodiments, the VA system 104 may be configured to treat the files and configuration data stored in the image as a virtual machine, illustrated in FIG. 1A as virtual machine 116. Represented by files 118-122 and configuration settings 124, virtual machine 116 is a collection of files and data that can be run as an application, system, etc. In this example, virtual machine 116 is a system resource that has been abstracted based on a logical grouping of all system resources. In other examples, the abstraction of other system resources can develop multiple virtual machines on a single computer, client, server, etc. Abstracting or virtualizing resources is an efficient technique for assessing system resources for a variety of operations including resource allocation and system restoration. In some embodiments, the files 118-122 and configuration settings 124 may be a snapshot in time of the files 108-112 and configuration settings 114 as they existed on system 107, or some other system, at the time the image being assessed for vulnerabilities was made.

VA system 104 may be configured to perform a vulnerability assessment on the virtual machine 116, just as it would on a currently operating physical system such as system 107, including by accessing the configuration settings 124 as it would in the case of a running system and changing the configuration settings and associated data as necessary to repair a discovered vulnerability, such as by installing a software patch or other corrective measure. Providing the ability to access the files and configuration settings in this manner enables the VA system 104 to repair the image associated with virtual machine 116, with the result that a system (such as system 107) that is later restored or configured using the image will not have the vulnerability detected and repaired in the image by VA system 104.

Figure 1B:
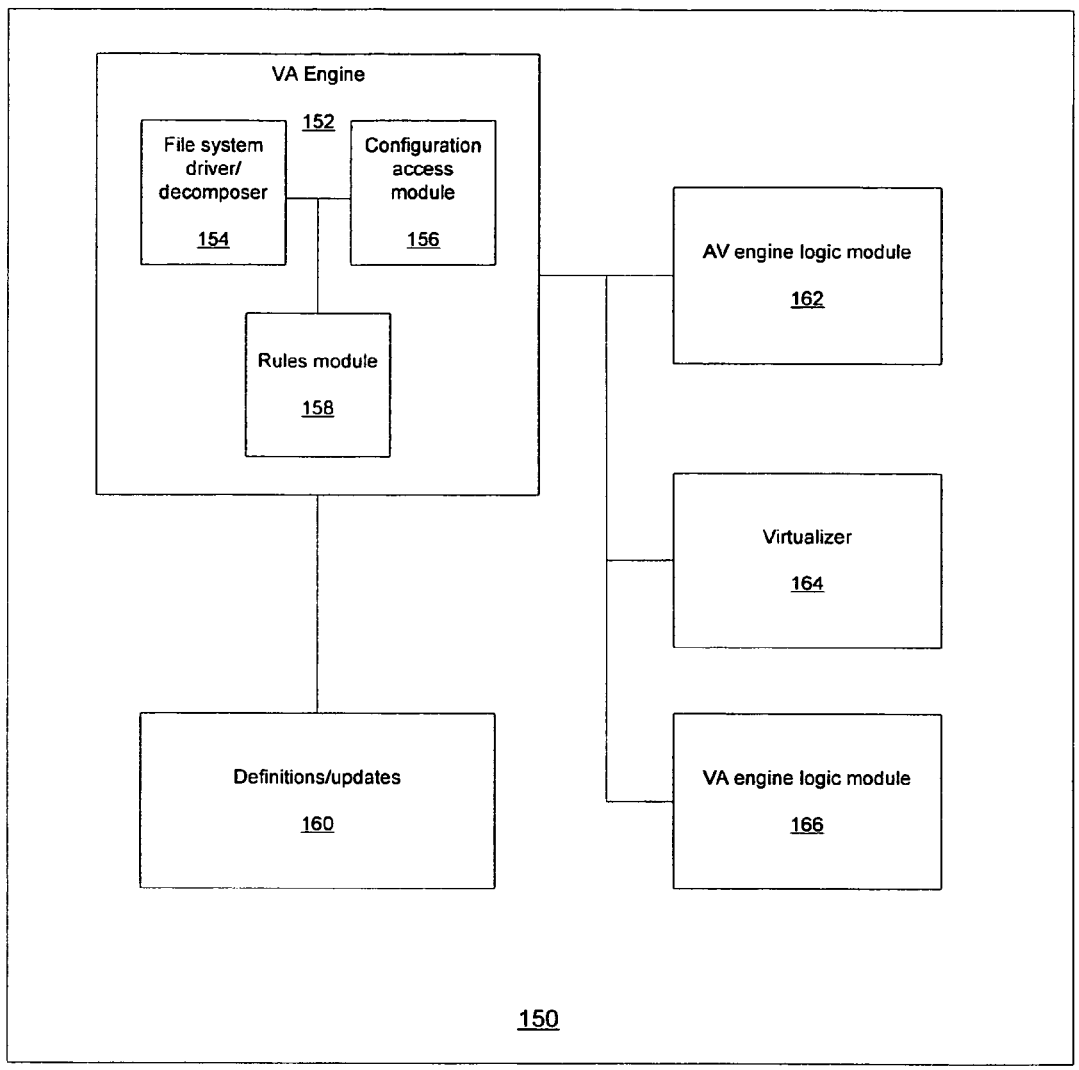
FIG. 1B illustrates an exemplary VA system including a VA engine and associated modules.

FIG. 1B illustrates an exemplary VA system including a VA engine and associated modules. In this example, VA system 150 includes VA engine 152. In some embodiments, VA system 150 may correspond to VA system 104 shown on host 102 (FIG. 1A). VA engine 152 provides central management and administration for VA system 150 for assessing vulnerabilities in images, including associated data, files, and configuration settings, among other information. Included within VA engine 152 are file system driver/decomposer 154 (hereinafter "decomposer"), configuration access module 156 and rules module 158. Rules module stores and provides user or system-specified rules and policies with regard to the operation of VA system 104. Rules, which may be specified to override VA engine logic module 166 can be specified and stored in rules module 208. Security definitions and updates are stored and referenced in definition updates module 160. Vulnerabilities can be determined based on comparing security definition/updates to the state of an image. By comparing data in a scanned image (e.g., file systems, configuration settings, configuration of data in specific patterns) to known exploitation techniques such as worms, viruses, behavioral tactics, and other security risks, VA engine 152 can assess whether a vulnerability exists in the image. In this example, logic for anti-virus detection and correction is provided by AV engine logic module 162. In other examples, other security measures (e.g., worn/virus patches, security definition/updates, etc.) can also be included along with corresponding logic modules. Typical AV applications can scan system files, but are not able to scan system files as though they were part of a standalone system or collection of files that can be run as a "virtual machine." Here, AV engine logic module 162 can scan system files, memory, and configuration settings (e.g., Windows registry) and perform anti-virus functions as though the system files, memory, and configuration settings were part of a separate or virtual machine. In this and other embodiments, VA system 150 can handle a collection of system files, memory, and configuration settings on a machine as a separate or virtual machine.

Virtualizer 164 provides an abstraction capability in order to provide logical abstraction of physical system resources (e.g., images, files, applications, and other forms of data) that are being assessed by VA engine 152, such as by operation of the decomposer 154 and configuration access module 156. Virtualizer 164 can be implemented as part of VA system 150, a modular component of VA engine 152, or as a separate application communicating, for example, via an application programming interface (API) such as that may be used by a third-party vendor or developer. Regardless, virtualizer 164 provides the ability to abstract an image of disparate physical resources into a single virtual resource, which can then be accessed by decomposer 154 and configuration access module 156. VA engine 152 is guided by VA engine logic module 166, which performs management and control functions for VA engine 152 such as analyzing files or images of virtual systems. VA engine 152 and its associated modules can be implemented as a standalone as illustrated. In other examples, VA engine 152 can be implemented as a distributed computing system over using multiple hosts or virtual machines to implement each module.

Figure 2:
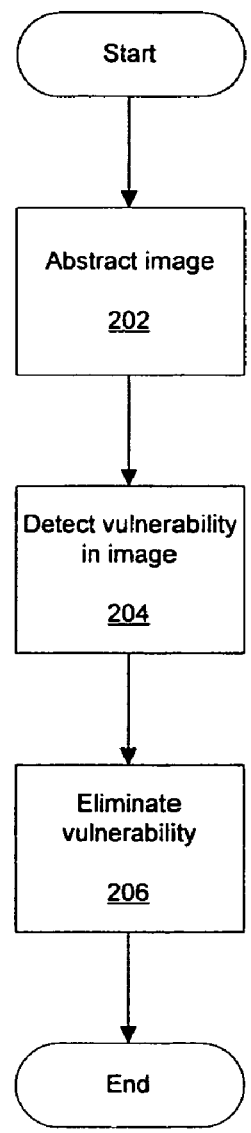
FIG. 2 illustrates a process of assessing a vulnerability in an image.

FIG. 2 illustrates a process of assessing a vulnerability in an image. An image is accessed in a manner that allows the vulnerability assessment to treat the files and data comprising the image as an instance of a runtime system or environment (202). Once accessed, the image is scanned to detect a vulnerability (204). The vulnerability may be pre-existing, but is more likely to occur in the intervening period between the time the image was created and the time the image was scanned, for example, prior to using the image in a system restoration. Once detected, the vulnerability is eliminated by repairing, patching, or fixing the image, such as by deleting, modifying, and/or adding files or configuration data (206).

Figure 3A:
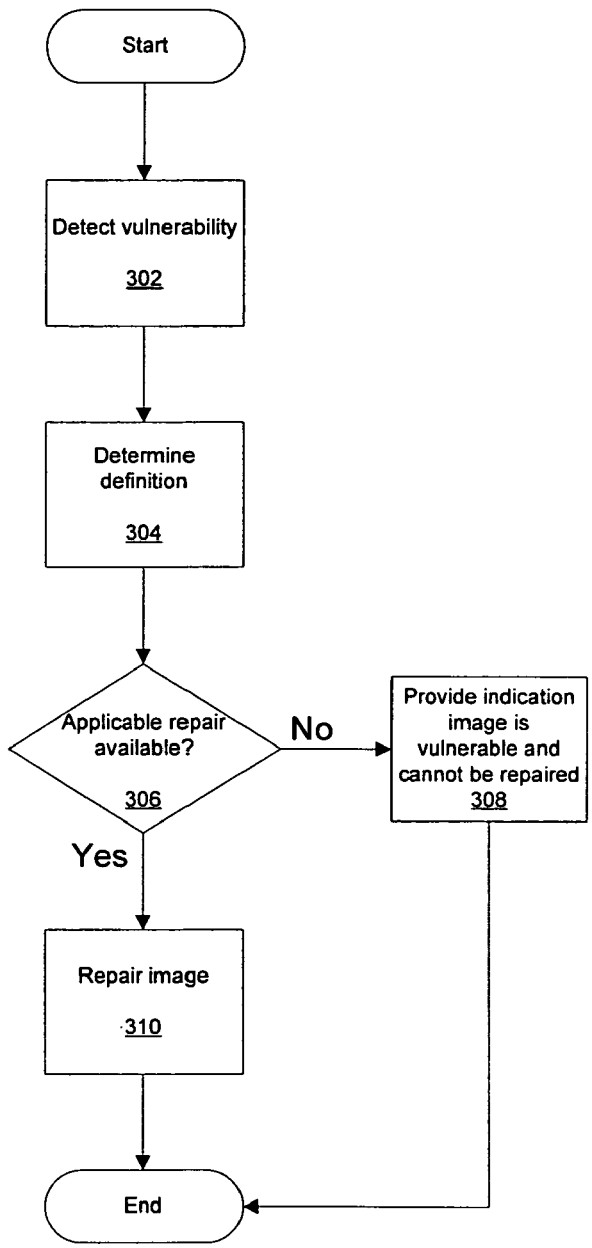
FIG. 3A illustrates assessing a vulnerability in an image.

FIG. 3A illustrates assessing a vulnerability in an image. While scanning an image of a file, file system, virtual machine, disk, or other resource VA engine 152 detects one or more vulnerabilities (302). Directed by VA engine logic module 166, VA engine 152 calls definition updates module 160 to determine whether a security definition/update or fix is available and/or required (304). In other examples, VA engine 152 requests security definition/updates, patches, or fixes that can be used to eliminate the detected vulnerability. In some embodiments, step 304 may precede step 302 and the security definition may be used to detect the vulnerability, as in step 302. Although the vulnerability may not have existed at the time the image was created, the vulnerability may have been revealed by a subsequent virus, worm, hack, phreak, or other type of security breach. Typical image scanning and detection applications are limited in that they cannot detect and repair (particularly when using configuration settings to do so) vulnerabilities found in images. The approach described herein allows the current state of the image to be determined and any vulnerability to be repaired in the image, thereby rendering the image safe for use in system restoration, configuration, etc.

Once a security definition/update has been retrieved from definition updates module 160, VA engine 152 tests the security definition/update to determine whether an applicable repair (e.g., a software patch) is available to be installed to repair the vulnerability (306). If no applicable repair is available to install, then an indication is provided that the image is vulnerable and cannot be repaired (308). In some embodiments, step 308 comprises taking action to prevent a system restoration application or system configuration tool from using the image to restore or configure a system. A user may establish a rule or policy to prevent the use of an image or to prevent a particular type of repair or restoration from occurring. In one embodiment, step 306 comprises testing an available repair against user-specified criteria and only applying the repair if the repair satisfies the user-specified criteria. Rules or test criteria can be specified, either by a user/administrator or a system on the host that determines whether a specific security patch or other corrective measure is to be installed. In this embodiment, the test criteria may include preventing the installation of a security patch because of an incompatibility with an operating system. In other embodiments, the test criteria may include preventing the execution of an anti-virus scan because of time/processor requirements interfering with user/administrator preferences (i.e., user/administrator is running time-critical maintenance and delays the installation of a security patch because additional time is required. In still other embodiments, test criteria may specify that a particular corrective measure is to be automatically installed. Test criteria may also be used to determine whether a specific corrective measure is compatible with the current operating environment. If it is determined in step 306 that an applicable repair is available, then the repair is installed in the image (310). Installation or implementation of the security definition/update is described in detail below in connection with FIGS. 4-7.

Figure 3B:
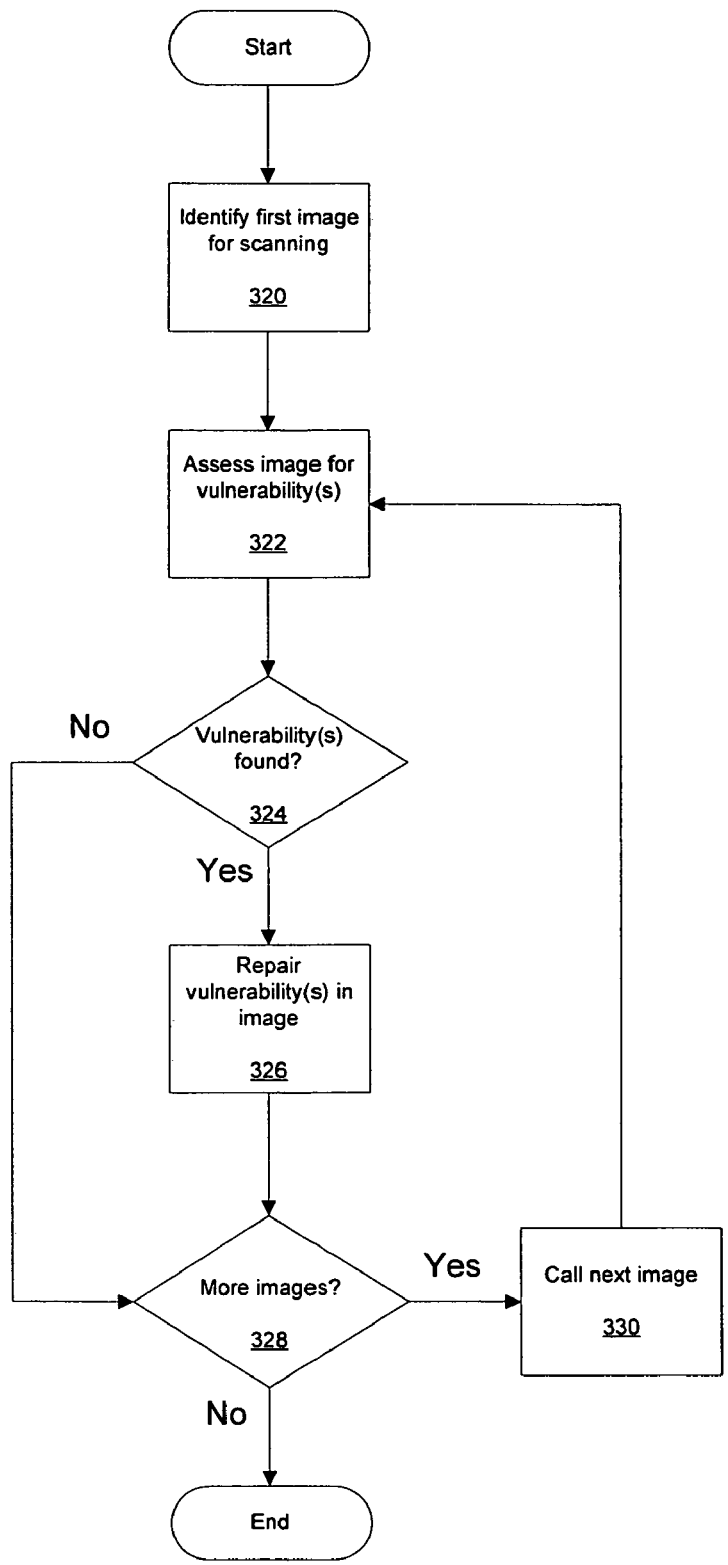
FIG. 3B illustrates assessing a vulnerability in an image, in accordance with an alternative embodiment.

FIG. 3B illustrates assessing a vulnerability in an image in an environment in which multiple images may be present. A first image is identified for scanning (320). The scan can be performed prior to using the image to restore a failed system back to a safe state. Alternatively, the scan can also be user-directed or system-directed. Further, scanning can be performed using various methods (e.g., recursive, depth first, etc.). In some cases, images may exist within other images and each image may be scanned in turn or in, for example, a recursive manner. In other words, scans can be performed at times outside of system restoration events. The image is assessed to determine whether a vulnerability exists (322). Vulnerabilities are determined by comparing files, file systems, and their corresponding configuration settings to known definitions or security threats and risks, stored in either definition updates module 160 (FIG. 1B) or memory (106). Alternatively, in a network or multi-host environment, security definition/updates may be called from another host other than host 102 (FIG. 1A) on which VA engine 152 and VA system 102 are installed.

VA engine 152 determines whether a vulnerability has been detected in an image (324). If a vulnerability is found, then VA engine 152 initiates repair of the image in order to restore the image to a safe condition (326). Repair of the image is discussed in greater detail in connection with FIGS. 4B and 4C. Once repaired, the image may be used for a system restoration or configuration. In other embodiments, the image may be repaired without immediately using the image in a system restoration or configuration. User or system-configured rules can be specified to perform a vulnerability assessment and repair independent of a catastrophic system failure or configuration event. Rules and other test criteria to determine whether to use the image to perform a system install are stored in rules module 158 and can be called by VA engine logic module 166. However, if no vulnerability is found in the current image, then VA engine 152 determines whether there are any more images available for scanning (328). If no image is present, then the process ends. If another image is present, then VA engine 152 calls the next image, restarting the scanning process (330). In some embodiments, an image may itself comprise one or more images and for each such image the process shown in FIG. 3B is repeated for each image embodied in the image until all such images have been scanned and, if applicable, repaired.

Figure 4A:
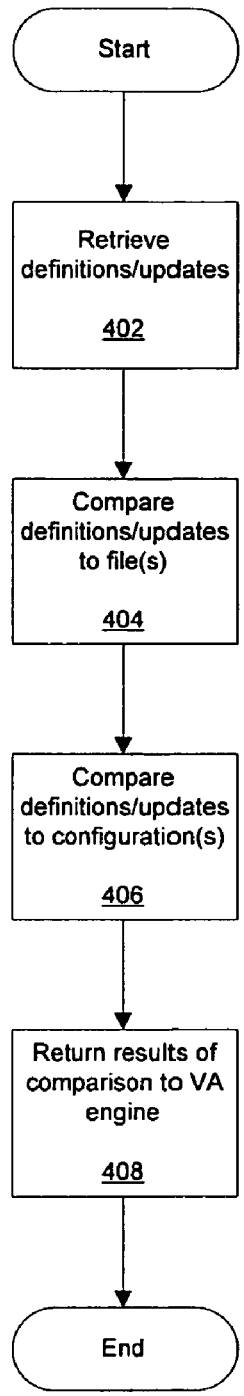
FIG. 4A illustrates repairing an image by eliminating a vulnerability using a security definition/update.

FIG. 4A illustrates identifying a vulnerability in an image using a security definition/update. In some embodiments, step 322 may comprise the process shown in FIG. 4A. In this example, a security definition/update is retrieved from definition updates module 160 (402). In other examples, security definitions/updates may be retrieved from other sources, including other hosts, databases, or other storage facilities containing vulnerability assessment information. Once retrieved, security definitions/updates are used to compare data in files associated with an image (404). In some operating systems/environments, security definitions/updates may be used to check, for example, for the presence of a specific virus or worm within an image or its associated files and configuration settings. By ensuring that current security definitions/updates are maintained in definition updates module 160, an image is checked for a safe state at a time when the image can be used to perform a system restore, instead of when the image was created, preventing exposure to a vulnerability that was discovered after the image was created. After checking files, which may be data, applications, or programs, VA engine 152 determines whether the configuration settings of a file are set in such a way as to expose a vulnerability (406). If, during either the comparison to the file or configuration settings, a vulnerability is found, then the results of the assessment are returned by VA engine logic module 166 to VA engine 152 (408). Once returned, the results can be used to determine a corrective action, if any, to protect the image from the vulnerability and place the image into a safe state.

Figure 4B:
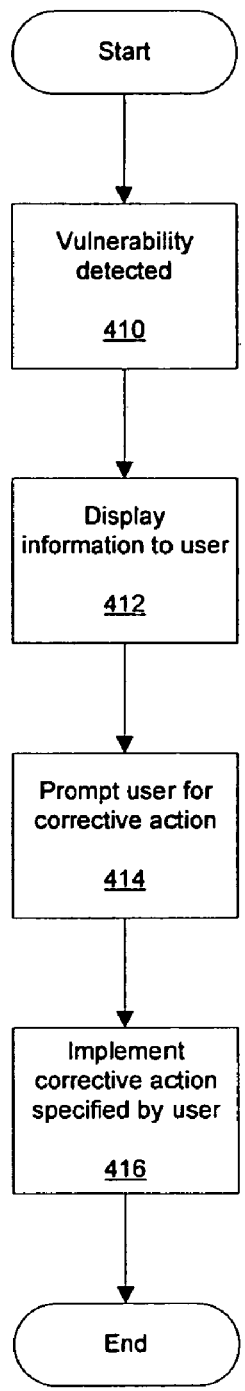
FIG. 4B illustrates a user-based approach to handling a detected vulnerability by VA engine.

FIG. 4B illustrates a user-based approach to handling a detected vulnerability. A vulnerability is detected in an image (410). Information is collected and displayed to a user, providing information such as the detected vulnerability or threat, the type of vulnerability or threat, a recommended corrective action (412). Once information is displayed to the user, a prompt is given, requesting input from the user (414). An input is received from the user (e.g., system/network administrator) indicating a corrective action to be taken and that corrective action is performed (416).

A corrective action may include installing a security patch, instantiating an anti-virus session, disabling an exploitation application, or other effort to either eliminate the detected vulnerability or to prevent the exploitation of the vulnerability. The corrective action may also include modifying configuration settings to place an image of an operating system, application, client, host, virtual machine, or other process in a safe state. Corrective action may also include specifying that no action be taken against the detected vulnerability. Another corrective action may include deleting the image. For example, in an application such as Symantec Corporation's Ghost utility, machines may not be backup images and deleting the image may be an appropriate action without causing further system damage. Another example may prevent corrective action that modifies an image to close a port that provides remote access that, although accessible by an intruder, is required for access by authorized remote users. Preferably, a corrective action is selected that removes exposure to the detected vulnerability by patching, fixing, eliminating, or preventing external exploitation. Although this example illustrates user-specification of rules, system-specified rules can be employed in other embodiments.

Figure 4C:
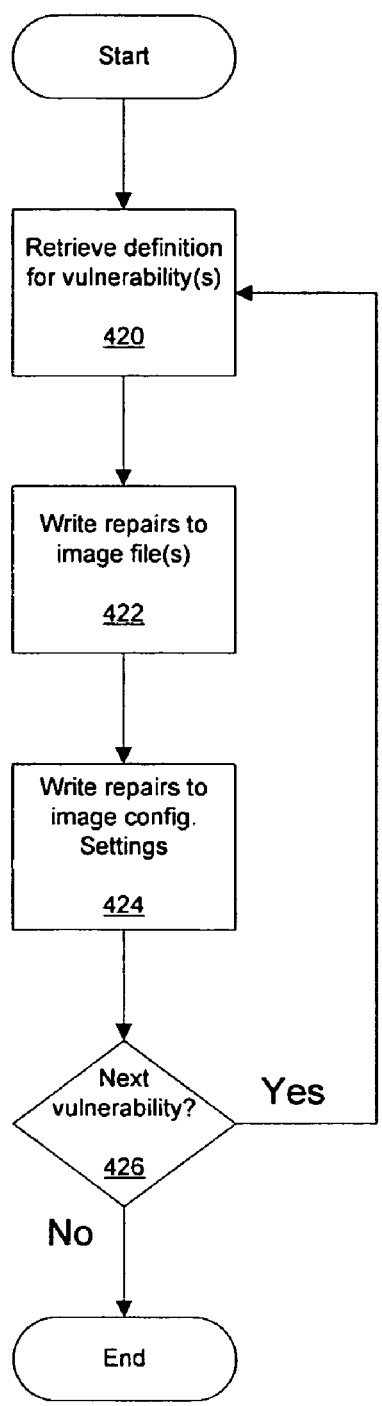
FIG. 4C illustrates repairing a detected vulnerability in an image.

FIG. 4C illustrates repairing a detected vulnerability in an image. Referring to FIG. 3A, after the security definition/update has been tested or approved for implementation, the security definition/update is called from definition updates module 160 by VA engine 152 (420). This process may be used to repair an image, for example, as specified in FIG. 3A. Once called, the security definition/update (e.g., security patch, fix, application, etc.) is written to the file(s) including the vulnerability (422). If the vulnerability in the image exists in the configuration settings, the security definition/update may direct the modification of the configuration settings to place the image in a safe state (424). Once repairs, blocking, hardening, or other fix is written to the indicated files in the image, VA engine 152 determines whether another vulnerability exists that requires corrective action (426).

If another detected vulnerability exists, then VA engine 152 retrieves the security definition/update for the next detected vulnerability. The process ends if no further detected vulnerabilities are found. In this example, multiple vulnerabilities can be detected and repaired. Recursively scanning and handling multiple vulnerabilities are scanned and repaired, writing data to files or modifying configuration settings of the selected images. VA engine 152 can loop back and call the next definition for the next detected vulnerability. In this example, the next definition for the next detected vulnerability is called in a recursive manner. In some embodiments, detected vulnerabilities can be queued for repair. In other embodiments, vulnerabilities can be detected and repaired individually.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for assessing a vulnerability in an image having a file and a configuration setting, comprising:

providing access to the image to allow the configuration setting to be manipulated;

identifying the vulnerability in the image; and eliminating the vulnerability in the image by manipulating the configuration setting;

wherein providing access to the image to allow the configuration setting to be manipulated includes providing access to at least the file and the configuration setting in a virtual environment in a manner that allows the configuration setting to be changed by modifying a portion of the image that is associated with a configuration database in which the configuration setting is stored with the result that the vulnerability is eliminated from the image by manipulation within the virtual environment of data comprising the image; and wherein the virtual environment comprises a virtual machine that emulates a running system of which the file comprises a system file and the configuration setting comprises a system configuration setting.

2. A method for assessing a vulnerability in an image as recited in claim 1 wherein providing access to the image to allow the configuration setting to be manipulated further includes providing access to the file.

3. A method for assessing a vulnerability in an image as recited in claim 1 wherein eliminating the vulnerability in the image further includes updating the configuration setting.

4. A method for assessing a vulnerability in an image as recited in claim 1 wherein eliminating the vulnerability in the image further includes modifying the file.

* * * * *